F. L. McDOWELL.
WIND AND WATER POWER WHEEL.
APPLICATION FILED MAR. 12, 1920.
1,413,861.  Patented Apr. 25, 1922.
2 SHEETS—SHEET 1.
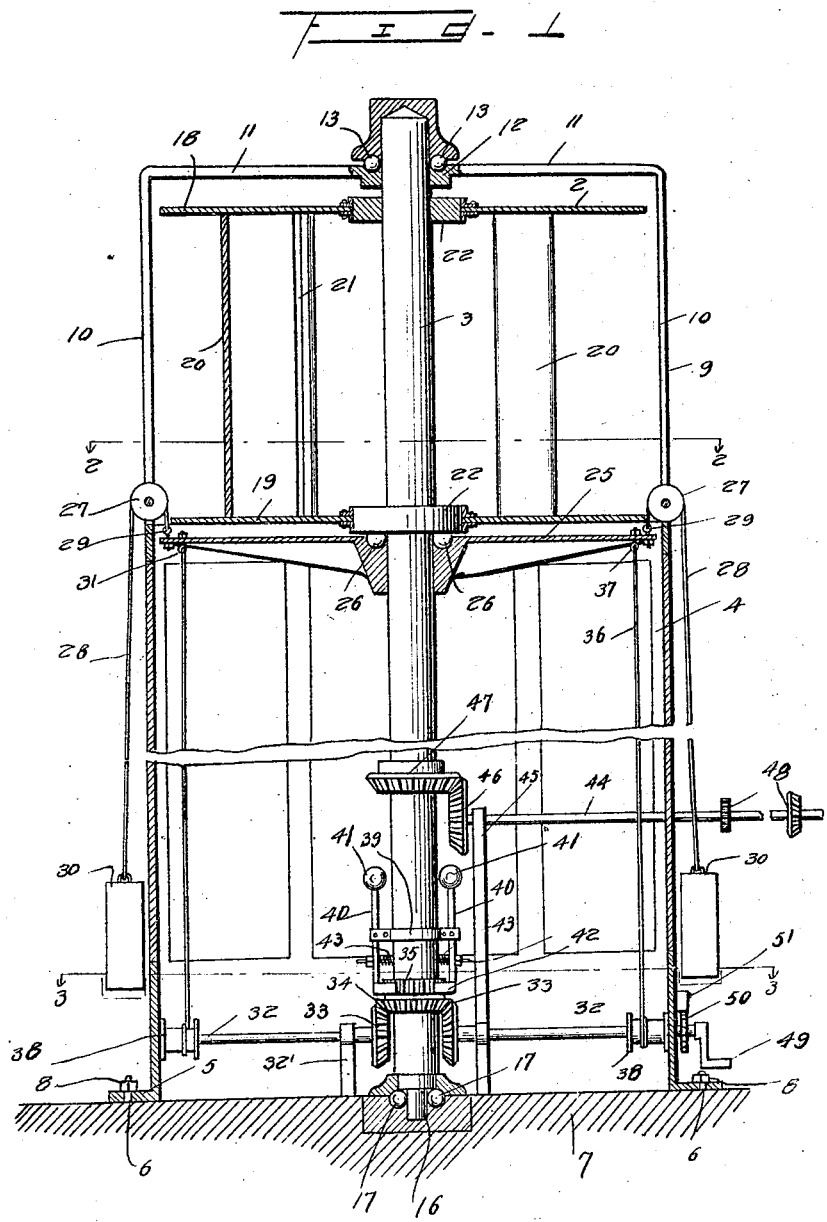
Inventor
F L. McDowell.
By 
Attorney F. L. McDOWELL.
WIND AND WATER POWER WHEEL.
APPLICATION FILED MAR. 12, 1920.

1,413,861.

Patented Apr. 25, 1922.
2 SHEETS—SHEET 2.

Inventor
F. L. McDowell.
By [signature]
Attorney

UNITED STATES PATENT OFFICE.

FREDERICK L. McDOWELL, OF RAYMOND, WASHINGTON.

WIND AND WATER POWER WHEEL.

1,413,861.  Specification of Letters Patent.  Patented Apr. 25, 1922.

Application filed March 12, 1920. Serial No. 365,219.

*To all whom it may concern:*

Be it known that I, FREDERICK L. Mc-DOWELL, a citizen of the United States, residing at Raymond, in the county of Pacific and State of Washington, have invented certain new and useful Improvements in Wind and Water Power Wheels; and I do hereby declare the following to be a full, clear, and exact description of the invention, such as will enable others skilled in the art to which it appertains to make and use the same.

This invention relates to power wheels such as wind wheels, water wheels, etc., and has for its primary object to provide a power wheel that can be lowered into a protecting casing so that the wind, water or whatever fluid that may be operating the wheel, cannot act upon the blades to turn the same.

Another object of the invention is the provision of means for automatically controlling the speed of the wheel by moving said wheel into and out of the protecting casing as the speed increases and decreases, thereby keeping the wheel running approximately the same rate of speed as the driving forces against the same increase.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a vertical sectional view, illustrating a wind or water power wheel constructed in accordance with my invention.

Figure 2:
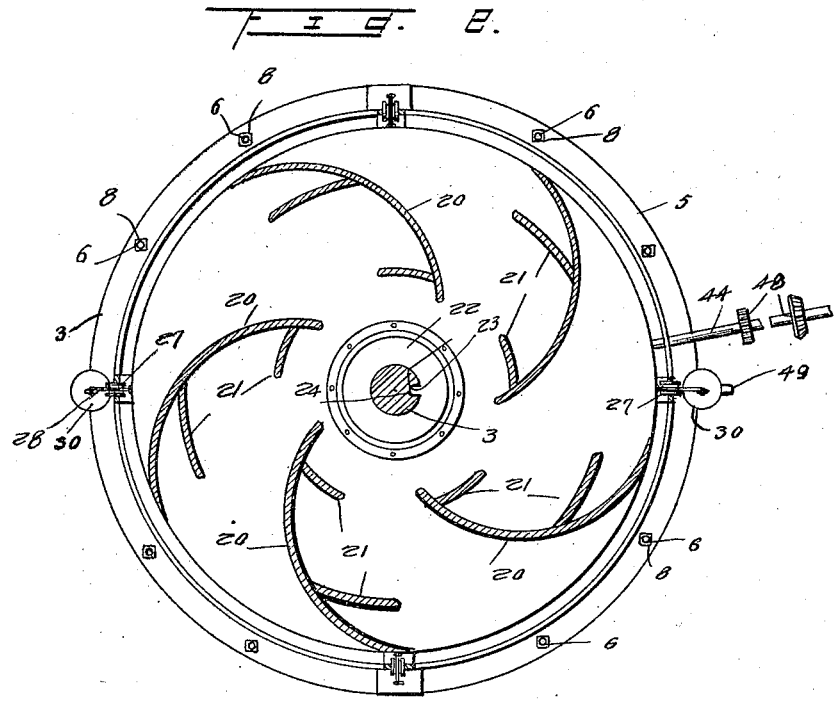
Fig. 2 is a horizontal sectional view taken on the line 2—2 of Figure 1.
Figure 3:
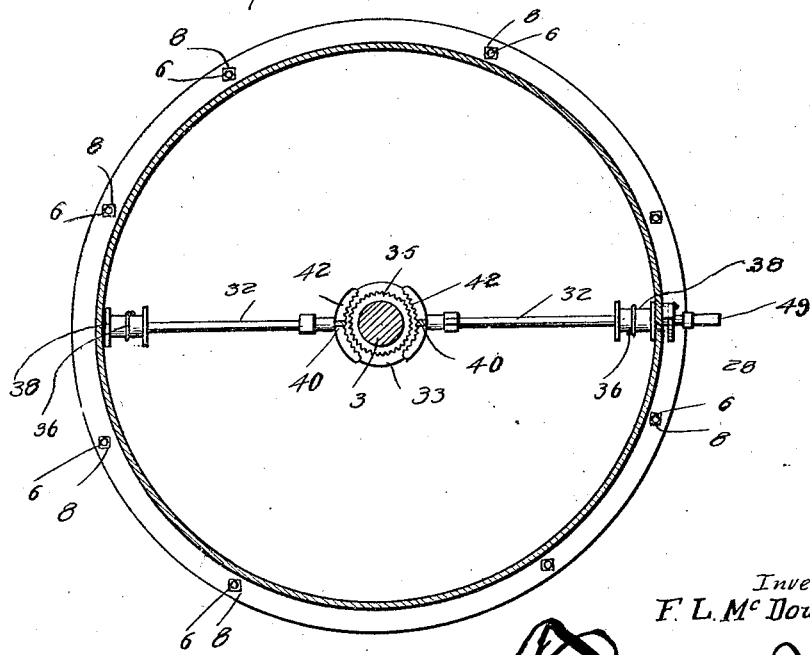
Figure 3 is a similar view taken on the line 3—3 of Figure 1.

Referring to the drawings in detail wherein similar reference numerals designate corresponding parts throughout the several views, the numeral 1 generally indicates the improved device which includes the wheel 2, that is mounted upon a shaft 3 for vertical sliding movement along the same and for rotation therewith.

A cylindrical protecting casing 4 is provided for the wheel 2 and the lower end of the casing has an outwardly extending flange 5 which receives bolts 6 anchored in a concrete base 7 provided for the casing and nuts 8 are threaded on the bolts 6 and engage the flange and hold the casing in position. The upper end of the casing 4 is open and a cylindrical frame 9 is built on the same and consists of a plurality of spaced upwardly extending rods 10 that have their upper ends bent at right angles as at 11 that extend inwardly towards the vertical axis of the casing and have their free ends secured to a hub 12. The shaft 3 extends through the center of the casing 4 and projects outwardly of the same into the frame 9 and has its upper end journaled in the hub 12 which carries suitable bearings 13 for the same. The shaft 3 has its lower end received and journaled in the cement base 7 as at 16, suitable bearings 17 being provided for that purpose.

The wheel 2 consists of the upper disk shaped plate 18 and the lower disk shaped plate 19 and a plurality of transversely curved blades 20 which are secured between the plates and are provided with suitable braces 21 to strengthen the same. Each of the plates 18 and 19 have hubs 22 which carry inwardly extending pins 23 which slidably engage in a slot 24 extending from one end of the shaft 3 to the other, so that upon rotation of the wheel 2, the shaft 3 will rotate therewith. By this construction, the wheel 2 can also be slid up or down said shaft. The upper plate 18 forms a suitable cover for the cylindrical casing when the wheel 2 is lowered.

The hub 22 of the plate 19 engages a plate 25 slidably mounted on the shaft 3 and suitable bearings 26 are provided so that the wheel 2 and the shaft 3 can rotate freely and independently of the plate 25. A plurality of pulleys 27 are secured on the upper edge of the cylindrical casing 4 and cables 28 extend over the same and are secured to eyes 29 carried by the upper face of the plate 25 and have counter-weights 30 attached thereto which are adapted to raise and support the wheel outwardly of the protecting casing until the wheel reaches a certain space.

A pair of horizontally disposed shafts 32 have their inner ends journaled in supports 32' carried by the base 7 and their outer ends journaled in the casing 4 and one of said shafts as clearly shown in Figure 1 extend through said casing. Pinions 33 are secured to the inner ends of the shafts 32 and mesh with a gear 34 which is mounted on the lower end of the shaft 3 and is free to rotate independently of said shaft and has formed integrally therewith a clutch face 35. Cables 36 are secured to the plate 25 by eye bolts 37 and have their lower ends secured to and wound on drums 38 in opposite directions and which drums are secured to the shafts 32 within the casing 4. A collar 39 is secured to the shaft 3 and has pivoted thereto governor arms 40 that have their upper ends provided with weights 41, while their lower ends have formed integrally therewith clutch elements 42 disposed oppositely to the clutch face 35 of the gear 34 and said clutch elements 42 are normally held out of engagement with the clutch face 35 by springs 43. When the shaft 3 reaches a certain speed of rotation caused by the wheel 2 being driven by wind or other fluid, the upper ends of the governor arms 40 swing outwardly moving the clutch elements 42 into engagement with the clutch face 35 thus causing the gear 34 to rotate with the shaft 3 which in turn rotates the shaft 32 winding the cables 36 on the drums causing the wheel 2 to be drawn downwardly in the casing 4 and out of the wind and as soon as the speed of the wheel or shaft 3 decreases to a certain point, the springs 43 disengage the clutch elements 42 from the clutch face 35 stopping the driving action of the shaft 3 on the shaft 32, the weights 30 then draw the wheel 2 upwardly out of the casing and into the wind again to continue its driving. Thus it will be seen means has been provided whereby the speed of the wheel 2 can be governed and kept rotating at approximately the same rate of speed at all times regardless of the increase of the force acting against the wheel.

A power take off shaft 44 extends into the casing 4 and has its inner end journaled in a support 45 and also has connected thereto a gear 46 which meshes with a gear 47 fixed to the shaft 3 whereby said shaft 44 will be driven by the shaft 3. The outer end of the shaft extends a short distance from the casing 4 and is provided with gears 48 so that other devices can be connected to the shaft 44 to be driven by the wheel 2.

The shaft 32 which extends through the casing 4 is provided with a crank handle 49 and also a ratchet wheel 50 adapted to be engaged by a dog 51 when it is desired to lock the wheel downwardly within the casing 4. When it is desired to stop the rotation of the wheel 2, the crank handle 49 is rotated winding the cables 36 on the drums which draws the wheel 2 downwardly in the casing out of the wind, thus stopping the rotation thereof and when said wheel is within the casing, the dog 51 may be then swung into engagement with the ratchet wheel 50 for holding said wheel downwardly within the casing. As soon as the dog 51 is manually released from the ratchet wheel 50, the weights 30 move downwardly drawing the wheel 2 upwardly and out of the casing and into the wind.

While I have shown and described the preferred embodiment of my invention, it will be understood that minor changes in construction, combination and arrangement of parts may be made without departing from the spirit and scope of the invention as claimed.

Having thus described my invention, what I claim is:

A power wheel including a casing and a rotatably mounted vertical shaft projecting outwardly of the upper end of the casing, a windwheel splined to said shaft and adapted during non-rotation and when rotating faster than a predetermined speed to lie wholly within the casing, a windwheel engaging element slidable on the shaft and located wholly below the windwheel, pulleys carried by the upper edge of the casing, weighted elements trained over said pulleys and having their weighted ends disposed outwardly of the casing and having their other ends secured to said wheel engaging element to cause the latter to position the wheel outwardly of the casing for rotation at the upper part of the shaft, centrifugally controlled means driven by the shaft and located in the lower end of the casing, flexible elements wound on and secured to said means and to said wheel engaging element to lower the latter for positioning the wheel in the casing when the latter rotates faster than a predetermined rate of speed, and manually operated means connected to said first means for operating the latter to lower and retain the wheel in the casing against the influence of the weighted elements.

In testimony whereof I affix my signature in presence of two witnesses.

FREDERICK L. McDOWELL.

Witnesses:
ERNEST F. RHODES,
FRANK STENZEL.